March 4, 1947.  D. R. MacALPIN  2,417,003
CHANGEABLE PITCH AIRSCREW HUB
Filed Sept. 18, 1943  2 Sheets-Sheet 1

INVENTOR
DONALD R. MAC ALPIN
BY
Bean, Brooks, Buckley & Bean
ATTORNEYS

March 4, 1947.  D. R. MacALPIN  2,417,003
CHANGEABLE PITCH AIRSCREW HUB
Filed Sept. 18, 1943   2 Sheets-Sheet 2

INVENTOR
DONALD R. MacALPIN
BY
Beau, Brooks, Buckley & Beau
ATTORNEYS

Patented Mar. 4, 1947

2,417,003

UNITED STATES PATENT OFFICE 2,417,003

CHANGEABLE PITCH AIRSCREW HUB

Donald R. MacAlpin, Lackawanna, N. Y., assignor to Bell Aircraft Corporation, Buffalo, N. Y.

Application September 18, 1943, Serial No. 502,949

5 Claims. (Cl. 170—163)

This invention relates to airscrews, and more particularly to adjustable blade pitch propellers or rotors or airscrews such as are adapted for use in aircraft and the like.

One of the objects of the invention is to provide a propeller or rotor which embodies a hub and blade pitch control mechanism of rugged and structurally simplified and otherwise improved form. Another object of the invention is to provide an improved mechanism having the above said features, and which permits the blade elements thereof to be selectively adjusted in any desired manner. Another object is to provide a rotor or propeller embodying the above said features which comprises an interlocking structural unit having its parts so arranged that centrifugal force loads are carried from one blade root element of the hub around the device providing central connection to the drive shaft and thence into the opposite blade root hub element in such manner as to provide a complete interlocking circle of structural elements embracing the connection with the drive shaft whereby to withstand in improved manner the centrifugal forces acting upon the rotor blades. Another object of the invention is to provide a rotor or propeller arrangement embodying the abovesaid features and being of improved simplicity and lesser number of operative parts, and of reduced overall size and weight. Other objects and advantages of the invention will appear from the specification hereinafter.

Figure 1:
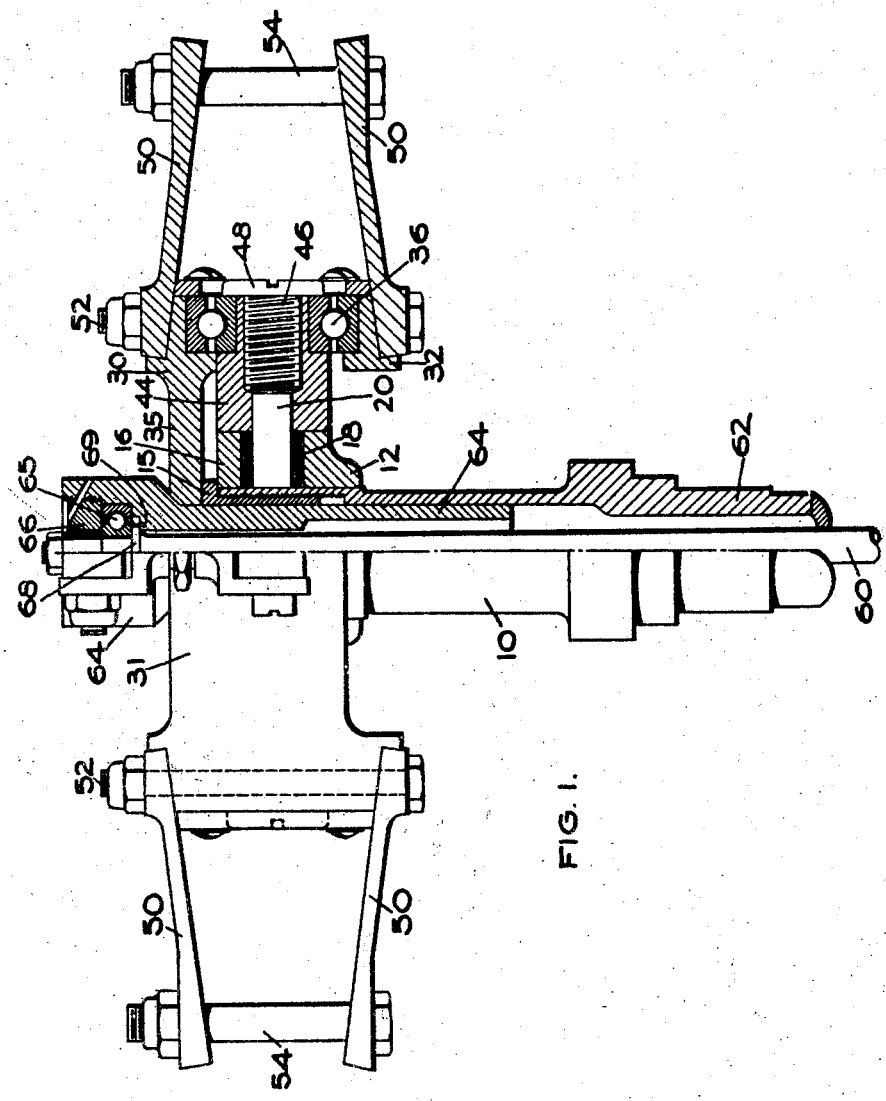
Fig. 1 is a side elevation, partly in section, of a rotor hub and blade pitch change mechanism of the invention.

The invention is illustrated in the drawing as being embodied in a rotor hub and rotor blade pitch change mechanism such as is specially adapted to comprise the hub of a two-bladed anti-torque rotor for use in helicopter air-craft or the like. The rotor power supply shaft is designated 10; and it will be understood that the shaft 10 may comprise any suitable shaft device mounted by bearings upon the aircraft structure to extend therefrom and to carry the rotor hub at the extending end portion thereof. The shaft 10 is shown herein as being of tubular formation so as to accommodate interiorly thereof the blade pitch change control member, as will be explained more fully hereinafter. However, other suitable forms of pitch change control devices may be employed in combination with the inventive features of the hub construction, and in such case the structure of the drive shaft 10 may be of accordingly modified form.

Figure 4:
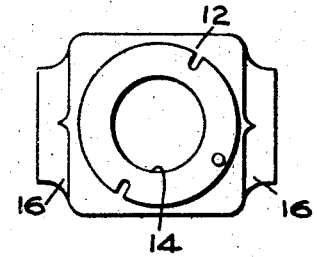
Fig. 4 is a disassembled view of the central hub element thereof.

The shaft 10 carries at its outer end a hub piece 12 which comprises as illustrated in detail in Fig. 4 a body centrally apertured as at 14 so as to be pressed-fitted upon the shaft 10 to be carried integrally therewith. A locking thimble 15 (Fig. 1) is threaded interiorly of the shaft 10 to hold the hub 12 in place thereon. The hub 12 is formed with a pair of diametrically opposed and laterally extending end portions 16—16 which are bored in common alignment and in a direction normal to the axis of the bore 14. Needle bearings 18—18 are mounted within the bored portions 16—16 of the hub so as to rotatably carry corresponding pivot pins 20—20 to extend therefrom.

A pair of generally C-shaped brackets 30—31 are arranged in relatively overlapped relationship and having their end portions mounted upon said coaxially disposed pins 20—20 to provide, in effect, a loop or link device embracing the hub piece 12 and comprising a pair of half link brackets 30—31 which are relatively pivotable about the axis of the pins 20—20.

Figure 2:
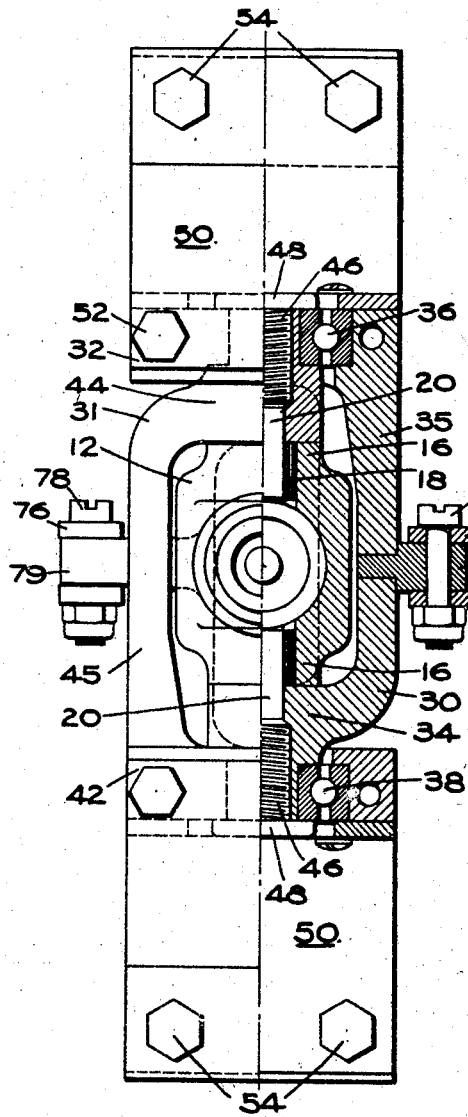
Fig. 2 is an end view, partly in section, of the mechanism of Fig. 1.

As shown more clearly in Fig. 2, the bracket 30 comprises a relatively large end portion 32 and a relatively small opposite end portion 34; and the end portions of each bracket are interconnected by a side plate portion 35. The bracket end portion 32 is bored to carry the outer race of a ball bearing 36; and the bracket end portion 34 is shaped to terminate in a stub portion which fits into the inner race of a ball bearing 38 carried by the bracket 31 in the manner of the mounting of the bearing 36 upon the bracket 30. The bearings 36—38 are of identical manufacture in the interests of standardization of parts. Also, the brackets 30—31 are of identical form. Thus, the bracket 31 comprises an enlarged end portion 42 carrying the bearing 38; a reduced end portion 44 engaging the inner race of the bearing 36; and a side or body portion 45; all of which correspond to the portions 32—34—35 of the bracket 30. Thus, the brackets 30—31 are adapted to be oppositely arranged and interlinked so that a small end of one and a large end of the other engage respectively in overlapped relationship and against the ends 16—16 of the hub 12.

The bracket small end portions are bored and tapped and screwthread mounted, as indicated at 46—46, upon the corresponding of the pins 20—20; and the pins 20—20 are headed at 48—48 to hold the bearings 36—38 in assembled relation upon the brackets 30—31. Thus, it will be understood that the bearings 36—38 interconnect the corresponding small and large end portions 44—32 and 34—42 of the bracket devices so as to maintain the latter to be locked together to form in effect a complete loop or link unit which embraces the hub 12 and comprises in effect two half link devices which are relatively pivotable about the common axis of the pins 20—20 and pivotable relative to the hub piece 12.

The enlarged end portions 32—42 of the brackets 30—31 may be provided with any suitable blade mounting means, such as is illustrated herein, by way of example, to comprise in each case a pair of oppositely disposed clamp plates 50—50 which are detachably mounted upon the bracket devices by means of bolts 52 carrying blade mounting bolts 54 at their outer ends so as to be adapted to engage in firmly clamped relation upon the root ends of the corresponding rotor blades. It will be understood, however, that any other suitable form of blade root receiving and fastening means may be employed in lieu of the specific form thereof illustrated and described.

Figure 3:
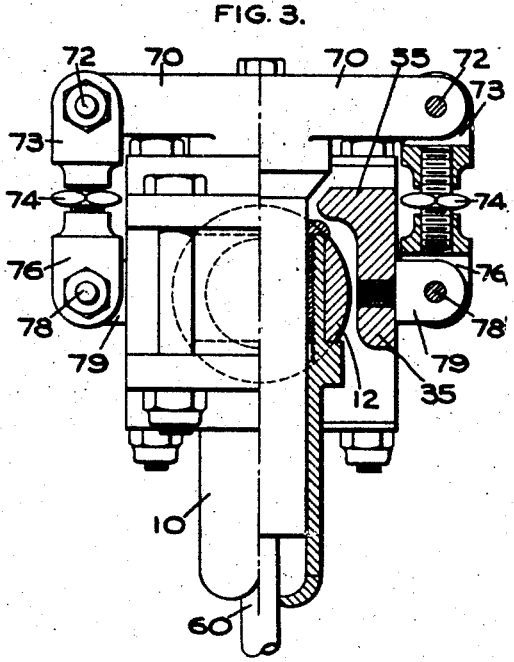
Fig. 3 is a plan view, partly in section, thereof.

Thus, it will be appreciated that the combination hub and blade mounting bracket devices described hereinabove are adapted to mount the rotor blades to extend radially from the shaft 10 and to be driven thereby upon rotation of the shaft while being free to turn individually in bearings 36—18 and 38—18 about the axes of the mounting pins 20—20, for blade pitch change purposes. Also, it will be seen that all centrifugal forces due to rotation of the blades about the axis of the shaft 10 will be transmitted directly by the blades into the C-brackets 30—31 and carried by the bracket devices around the hub 12 and then into the hub in the form of compression loads thereon. Thus, the small end portions 34—44 of the brackets will dissipate the centrifugal force loads through simple abutting pressures against opposite sides of the hub 12; and all other elements of the hub mechanism including the bearings 36, 38, and 18 are relieved of any duty with respect to combatting the effects of centrifugal forces. However, as illustrated in Fig. 3, the side plate portions 35 of the brackets 30—31 are preferably webbed, as at 55 to stiffen the body portions of the brackets against secondary loads incidental to primary loads transmitted through the rotor blades.

Any suitable arrangement for feathering or adjusting the pitch of the rotor blades may be embodied in combination with the rotor hub arrangement hereinabove described. For example, one form of blade pitch change mechanism that may be effectively employed may include a push-pull or other actuating control device threaded through the hollow interior of the drive shaft 10. In view of the character of the hub and blade carrying bracket arrangement of the invention, as explained hereinabove, the drive shaft 10 may be tubular form and the interior thereof occupied by a blade pitch change actuating mechanism without interfering with the structural or functional arrangement of the hub mechanism. For example, as shown in the drawing the blade pitch change mechanism may comprise a push-pull member 60 which is threaded through the shaft 10 and arranged to be longitudinally displaced for blade pitch adjustment purposes by any suitable pilot controlled mechanism (not shown) which may be connected to the end of the push-pull member 60 which is opposite to the end thereof shown in the drawing. For example, the shaft 10 may be arranged to mount a driving gear on a suitably shouldered portion of the shaft as indicated at 62, whereby power may be delivered to the shaft through the gear device and whereby the adjacent end portion of the push-pull member may be extended beyond the gear for connection to any suitable pilot controlled linkage or other actuating device.

At the hub end of the shaft 10 and interiorly thereof it is fitted with a sleeve 64 carrying a ball bearing 65 which is locked in position by a nut 66 subsequent to assembly of the push-pull rod 60 within the shaft 10. The rod 60 is shouldered at 68 to be engaged thereby between a shoulder portion 69 of the sleeve 64 and the bearing 65, to prevent longitudinal displacement of the rod 60 relative to the sleeve 64 without interfering with rotation of the sleeve and shaft and hub mechanism relative to the control rod 60.

Thus, push-pull movements of the rod 60 will actuate the sleeve 64 to move in corresponding directions axially of the rotor hub while being free at all times to rotate therewith. At its outer end the sleeve 64 carries a pair of diametrically opposed arms 70—70 (Fig. 3) each of which pivotally connects by means of a pin 72 with a clevis 73. The clevis 73 is tapped and threaded to receive one end of a corresponding adjustment screw 74, the other end of the screw being similarly received within a tapped and threaded clevis 76 which in turn pivotally connects by means of a pin 78 to a horn 79 extending laterally from a side portion of the corresponding one of said C-brackets 30—31. Thus, it will be understood that simple push-pull movements of the rod 60 relative to the drive shaft 10 will correspondingly pull or push upon the clevis-screw devices so as to simultaneously rotate the C brackets 30—31 in opposite directions about the axes of the bearings 36, 38, and 18, thereby procuring feathering or pitch adjustments of the rotor blades. The screws 74—74 may be manipulated whenever adjustment of the pitch control mechanism relative to the rotor blades is required.

Thus, the invention provides an unusually compact and structurally rugged, yet light-weight and smooth operating blade mounting hub and pitch change mechanism. It will be understood that although only one form of the invention has been shown and described in detail, it will be apparent to those skilled in the art that the invention is not so limited but that various changes may be made therein without departing from the spirit of the invention or the scope of the appended claims.

I claim:

1. An airscrew device comprising a drive shaft, a hub member secured to said shaft, diametrically opposed pins journalled in said member, a pair of brackets embracing said member, one end of each bracket being secured to one of said pins, the other end of each bracket being adapted to support a blade, and thrust bearing means interposed between the blade receiving end of each bracket and the pin receiving end of each other bracket, whereby said brackets are mutually pivotally related for adjustment about a common axis.

2. An airscrew device comprising a drive shaft, a hub member secured to said shaft, diametrically opposed pins journalled in said member, a pair of brackets embracing said member, one end of each bracket being secured to one of said pins, the other end of each bracket being adapted to support a blade, adjacent end portions of said brackets being concentric and axially coextensive, and thrust bearing means interposed between said adjacent end portions, whereby said brackets are mutually pivotally related for adjustment about a common axis.

3. An airscrew device comprising a drive shaft, a hub member secured to said shaft, diametrically opposed pins received in said member, antifriction bearing means interposed between said pins and said member, a pair of brackets embracing said member, one end of each bracket being secured to one of said pins, the other end of each bracket being adapted to support a blade, and thrust bearing means interposed between the blade receiving end of each bracket and the pin receiving end of each other bracket, whereby said brackets are mutually pivotally related for adjustment about a common axis.

4. An airscrew device comprising a drive shaft, a hub member secured to said shaft, diametrically opposed pins journalled in said member, a pair of brackets embracing said member, one end of each bracket being secured to one of said pins, the other end of each bracket being adapted to support a blade, and thrust bearing means interposed between the blade receiving end of each bracket and the pin receiving end of each other bracket, a laterally offset rigid connecting portion carried by each of said brackets, a push rod extending through said drive shaft and terminating beyond said hub member in a crosshead extending at right angles to said axis, and link means pivotally connecting the opposite ends of said crosshead and said laterally offset rigid connecting portions, whereby movement of said push rod axially of said drive shaft imparts arcuate movement to said brackets.

5. An airscrew device comprising a drive shaft, a hub member secured to said shaft, diametrically opposed pins journalled in said member, a pair of brackets embracing said member, one end of each bracket being secured to one of said pins, the other end of each bracket being adapted to support a blade, and thrust bearing means interposed between the blade receiving end of each bracket and the pin receiving end of each other bracket, a laterally offset rigid connecting portion carried by each of said brackets, a crosshead extending at right angles to said axis, a push rod extending through said drive shaft and terminating beyond said hub member in antifriction bearing engagement in said crosshead, said crosshead being fixed for joint axial movement with said push rod, and link means pivotally connecting the opposite ends of said crosshead and said laterally offset rigid connecting portions, whereby axial movement of said push rod imparts arcuate movement to said brackets.

DONALD R. MacALPIN.

REFERENCES CITED

The following references are of record in the file of this patent:

UNITED STATES PATENTS

| Number | Name | Date |
| --- | --- | --- |
| 494,014 | McGlasson | Mar. 21, 1893 |
| 1,871,124 | Landrum | Aug. 9, 1932 |
| 1,879,659 | Coolidge | Sept. 27, 1932 |
| 2,243,046 | Algarsson | May 20, 1941 |

FOREIGN PATENTS

| Number | Country | Date |
| --- | --- | --- |
| 130,664 | British | Aug. 14, 1919 |
| 412,133 | British | June 21, 1934 |
| 506,374 | British | May 26, 1939 |